No. 850,308. PATENTED APR. 16, 1907.
G. S. MacLEOD.
WIRE FENCING.
APPLICATION FILED NOV. 10, 1906.
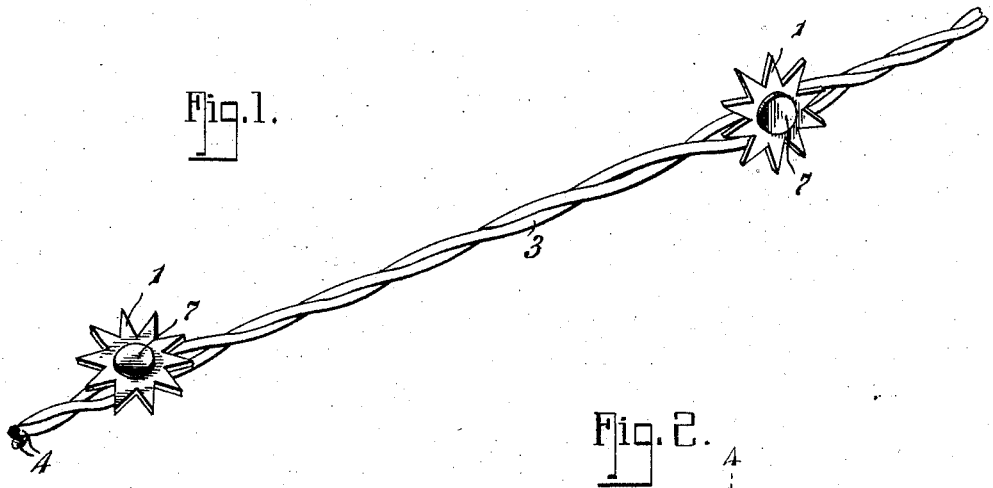
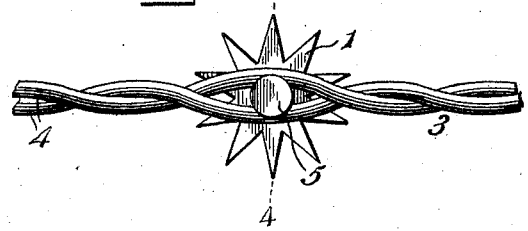
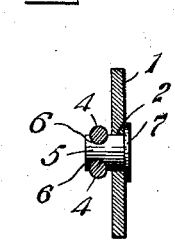
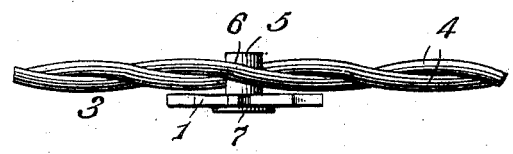
George S. MacLeod, Inventor.
Witnesses

UNITED STATES PATENT OFFICE

GEORGE STEWARD MacLEOD, OF EAST END, SASKATCHEWAN, CANADA.

WIRE FENCING.

No. 850,308.　　　　Specification of Letters Patent.　　　Patented April 16, 1907.

Application filed November 10, 1906. Serial No. 342,892.

*To all whom it may concern:*

Be it known that I, GEORGE STEWARD MACLEOD, a subject of the King of England, residing at East End, in the Province of Saskatchewan and Dominion of Canada, have invented a new and useful Wire Fencing, of which the following is a specification.

The invention relates to improvements in wire fencing.

Heretofore wire fencing has been constructed with spurs or rowels designed when an animal comes in contact with them to rotate, and thereby prevent the serious injury which is inflicted when an animal runs against an ordinary barbed-wire fence; but owing to the arrangement of such spurs or rowels between the twisted strands of the wire the latter when stretched to the proper tension has interfered with the rotary movement of such spurs or rowels, and such fences have been as injurious to stock as an ordinary barbed-wire fence.

The object of the present invention is to provide a wire fencing having spurs or rowels so arranged that the fence-wire may be stretched to any desired tension without affecting the free rotary movement of the spurs or rowels.

With these and other objects in view the invention consists in the construction and novel combination of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is perspective view of a piece of wire fencing constructed in accordance with this invention. Fig. 2 is a side elevation showing one of the spurs or rowels. Fig. 3 is a plan view of the same. Fig. 4 is a transverse sectional view on the line 4 4 of Fig. 2. Fig. 5 is detail perspective view of the pivot.

Like numerals of reference designate corresponding parts in all the figures of the drawings.

1 designates a rotary spur or rowel, designed to be arranged at intervals along the wires of a fence similar to the barbs of a barbed-wire fence and capable of rotary movement to prevent the injury which is inflicted by an ordinary barbed-wire fence when a horse or other animal runs against the same. The rotary spurs or rowel, which may be arranged any desired distance apart, are designed to be constructed of sheet metal or other suitable material, and they may be provided with any desired number of points or projections.

The rotary spur or rowel is provided with a central bearing-opening 2, and it is arranged exteriorly of a fence-wire 3, which is composed of twisted strands 4. The twisted strands 4 are separated to provide an elliptical opening or space to receive one end of a pivot 5, which projects laterally from the fence-wire to provide an exteriorly-arranged portion for supporting the rotary spur or rowel. The inner engaged portion of the pivot 5 is provided with opposite grooves 6 for the reception of the strands of the fence-wire, whereby the pivot is interlocked with the fence-wire and is securely held in such interlocked relation by the twisting of the wire and the tension on the same. The inner end of the pivot may be secured between the strands of a fence-wire in any other manner. The pivot is provided at its outer end with a head 7, and the rotary spur or rowel is arranged on the laterally-projecting portion of the pivot between the head thereof and the adjacent side of the fence-wire. The inner attached end of the pivot or rivet is of the same diameter as the body portion thereof, so that the pivots may be readily passed through the openings of the spurs or rowels in assembling the parts, and the pivots may be readily interlocked with the strands of the fence-wire when the same are being twisted. The stretching of the wire 3 simply operates to cause the strands to grip the attached portion of the pivot more securely and does not in any manner interfere with the free rotary movement of the spur or rowel, which will rotate freely should an animal run against the fence-wire, and while it may puncture such animal it will not tear or otherwise injure the same like an ordinary barbed-wire fence.

Having thus fully described my invention, what I claim as new, and desire to secure by Letters Patent, is—

1. The combination with a fence-wire composed of strands, of a rotary spur or rowel arranged outside of the strands and extending along the same, whereby the tension on the fence-wire will not interfere with the rotary movement of the spur or rowel, and means for connecting the spur or rowel with the fence-wire.

2. The combination with a fence-wire composed of strands, of a pivot mounted on the fence-wire and having an exteriorly-projecting portion, and a rotary spur or rowel mounted on the projecting portion of the pivot, whereby the spur or rowel is arranged along the outside of the strands and not between the same.

3. The combination with a fence-wire composed of twisted strands, of a pivot fitting between the strands and projecting beyond the same, and a rotary spur or rowel mounted on the projecting portion of the pivot, whereby the spur or rowel is arranged along the outside of the strands and not between the same.

4. The combination with a fence-wire composed of strands, of a pivot provided with opposite grooves receiving the strands, whereby the pivot is interlocked with the fence-wire, said pivot being also provided with an exteriorly-projecting portion, and a rotary spur or rowel mounted on the projecting portion of the pivot, whereby the spur or rowel is arranged along the outside of the strands and not between the same.

5. The combination with a fence-wire composed of twisted strands, of a pivot provided at its inner portion with opposite grooves receiving the strands of the fence-wire, said pivot having an exteriorly-projecting portion provided with a head, and a rotary spur or rowel arranged on the projecting portion of the pivot and located between the fence-wire and the said head, whereby the spur or rowel is arranged along the outside of the strands and not between the same.

6. The combination with a fence-wire composed of twisted strands, which are separated at one or more points to provide an elliptical-shaped space or opening, a spur, and means retained within said space or opening by the clamping action of the strands for supporting the spur at one side of the fence-wire.

In testimony that I claim the foregoing as my own I have hereto affixed my signature in the presence of two witnesses.

GEORGE STEWARD MacLEOD.

Witnesses:
HECTOR H. GILCHRIST,
DANIEL MORRISON.